United States Patent [19]
Bourne

[11] 4,329,851
[45] May 18, 1982

[54] ABSORPTION REFRIGERATION SYSTEM

[75] Inventor: Joseph R. Bourne, Syracuse, N.Y.

[73] Assignee: Carrier Corporation, Syracuse, N.Y.

[21] Appl. No.: 174,787

[22] Filed: Aug. 4, 1980

Related U.S. Application Data

[60] Division of Ser. No. 49,028, Jun. 14, 1979, Pat. No. 4,246,762, which is a continuation of Ser. No. 913,621, Jun. 8, 1978, abandoned.

[51] Int. Cl.³ .............................................. F25B 15/00
[52] U.S. Cl. ...................................... 62/101; 62/148; 62/235.1; 62/238.3; 62/476
[58] Field of Search ................. 62/101, 141, 148, 476, 62/2, 238.3, 104

[56] References Cited

U.S. PATENT DOCUMENTS

| | | | |
|---|---|---|---|
| 3,495,420 | 2/1970 | Loweth et al. | 62/476 |
| 3,651,655 | 3/1972 | Dyre | 62/148 X |
| 4,070,870 | 1/1978 | Bahel et al. | 62/2 |
| 4,073,285 | 2/1978 | Wendel | 126/417 |
| 4,100,755 | 7/1978 | Leonard | 62/2 |
| 4,179,895 | 12/1979 | Shimokawa et al. | 62/2 |

*Primary Examiner*—Lloyd L. King
*Attorney, Agent, or Firm*—J. Raymond Curtin; John S. Sensny

[57] ABSTRACT

An absorption refrigeration system having a generator that includes a first, or primary, heat exchanger operatively connected to a low temperature energy source and that includes a second, or auxiliary, heat exchanger operatively connected to a high temperature energy source. Control means are provided so that energy is supplied to the generator from the high temperature energy source only after energy is extracted from the low temperature energy source and additional energy is required by the system. Various embodiments are disclosed showing different ways of positioning and operating the primary and auxiliary heat exchangers. Another embodiment illustrates a condenser system that efficiently operates to condense refrigerant vapor regardless of the distribution of the energy contribution between the high and low energy sources.

7 Claims, 7 Drawing Figures

ABSORPTION REFRIGERATION SYSTEM

This application is a divisional application of application Ser. No. 049,028 filed June 14, 1979, now U.S. Pat. No. 4,246,762, is a continuation application of Ser. No. 913,621 filed June 8, 1978, now abandoned.

BACKGROUND OF THE INVENTION

This invention relates generally to absorption refrigeration, and more specifically to absorption refrigeration systems that utilize both a high temperature energy source and a low temperature energy source to generate a concentrated absorbent solution.

Generally, an absorption refrigeration system includes an evaporator, an absorber, a generator, and a condenser and uses an absorbent fluid such as lithium bromide and a refrigerant fluid such as water. The absorbent fluid is located in the absorber, the refrigerant fluid is located in the evaporator, and the absorber and evaporator are connected together so that refrigerant vapor can pass from the evaporator to the absorber. The absorbent fluid has an affinity for refrigerant vapor and absorbs refrigerant vapor that has passed from the evaporator to the absorber. This produces a pressure drop in the evaporator allowing more refrigerant to evaporate. A fluid such as water is circulated through a heat exchanging coil, referred to as the chilled water coil, which is positioned in the evaporator and connected as part of a closed loop fluid circuit to a refrigeration load. As refrigerant evaporates in the evaporator, it absorbs heat from the water passing through the chilled water coil. The water then absorbs heat from the refrigeration load such as an enclosure which is to be cooled.

As the absorbent fluid absorbs refrigerant vapor, it becomes diluted by the refrigerant and its affinity for refrigerant vapor decreases. In order to separate the absorbed refrigerant from the absorbing fluid and thereby obtain a concentrated absorbent fluid, the solution of refrigerant fluid and absorbent fluid is pumped from the absorber to the generator. A heat exchanging coil is positioned in the generator and a heated fluid such as steam from a source of heat such as an oil-fired steam generator is circulated through the coil. Heat is transferred from the coil to the solution of refrigerant and absorbent fluid and this heat vaporizes, or "boils off," refrigerant that had been absorbed by the absorbent fluid. The absorbent fluid is, thus, concentrated and the concentrated absorbent fluid is then returned to the absorber. The refrigerant vapor that was evaporated from the absorbent fluid in the generator passes to the condenser. In the condenser, it is condensed by a cooling fluid being passed through a heat exchanging coil that is positioned in the condenser. The condensed refrigerant then flows back to the evaporator where a new cycle can begin. Customarily, a heat exchanging coil is positioned in the absorber to cool the absorbent fluid as that fluid enters the absorber, and this heat exchanger is connected in series to the heat exchanger in the condenser. In this manner, only one source of relatively cool water such as a conventional water cooling tower is needed for the entire refrigeration system.

The heat needed to vaporize refrigerant from the solution of refrigerant and absorbent fluid; that is, to generate a concentrated absorbent fluid, can be provided by any suitable energy source such as steam, an electric resistance heater, or an oil-fired furnace. In absorption refrigeration systems that use these traditional sources of heat, the fluid that is passed through the heat exchanger in the generator is raised to about 250° F. before entering the heat exchanger. Recently, much attention has been directed toward using low temperature energy sources to generate a concentrated absorbent fluid. For example, consideration has been given to solar energy, geothermal energy, and the waste heat produced by many manufacturing processes. These low energy sources usually cannot provide a working fluid that has a temperature greater than 200° F., and often the fluid has a temperature of only 170° F. or 180° F. Also, these sources, particularly solar energy, are not as reliable as conventional energy sources. Many of the problems caused by the relatively low temperature and unreliability of these low temperature energy sources can be mitigated by using, in one way or another, a conventional high temperature energy source to augment or supplement the low temperature energy source. However, when a high temperature energy source is used in such a situation, the high energy source tends to contribute most of the required energy input while the low energy system, in effect, becomes a back up source. Since the low energy source is usually much less costly than the high energy source, in order to insure an economical operation of the absorption refrigeration system, the low energy source must contribute as much energy as possible both before and while the high energy source is asked to contribute energy to the system.

SUMMARY OF THE INVENTION

In view of the above, an object of this invention is to improve absorption refrigeration systems.

A further object of the invention is to provide an economical, simple, and reliable absorption refrigeration system utilizing a low temperature energy source.

Another object of this invention is to improve absorption refrigeration systems which utilize both a high temperature energy source and a low temperature energy source to generate a concentrated absorbent solution.

A still further object of this invention is to provide an absorption refrigeration system that utilizes both a high temperature energy source and a low temperature energy source where energy is supplied from the high temperature energy source only after energy is extracted from the low temperature energy source and additional energy is required.

A further object of this invention is to provide an absorption refrigeration system using both a primary source of energy and an auxiliary source of energy in a manner which controls the heat transmitted to the solution from the auxiliary source in response to the difference between the heat required to produce the desired concentrated solution and the heat transmitted to the solution from the primary source.

These and other objects are achieved by an absorption refrigeration system having a generator that includes a first, or primary, heat exchanger operatively connected to a low temperature energy source and that includes a second, or auxiliary, heat exchanger operatively connected to a high temperature energy source. Heat is transmitted to the dilute solution of refrigerant and absorbent fluid first from the low temperature energy source and then from the high temperature energy source. Control means are provided to regulate the amount of heat transferred to the solution from the high temperature energy source in response to the temperature of the water leaving the chilled water coil. In this manner, energy is supplied from the high temperature energy source only after energy is extracted from the low temperature energy source and additional energy is needed to produce the desired refrigerant effect. Various embodiments of the invention are disclosed showing different ways of positioning and operating the primary and auxiliary heat exchangers. Another embodiment discloses apparatus which condenses as well as evaporates the refrigerant fluid, and does so in a simple and efficient manner regardless of the distribution of the energy contribution between the high and low energy sources.

Further benefits and advantages of the invention will become apparent from a consideration of the following description given with reference to the accompanying drawings which specify and show a preferred embodiment of the invention.

A DETAILED DESCRIPTION OF A PREFERRED EMBODIMENT

For the purpose of this specification, it will be assumed that the absorption refrigeration system described herein is of the type which employs a hygroscopic brine as the absorbent and water as the refrigerant. Inasmuch as lithium bromide solution has been found to be a suitable absorber medium, reference will be made to the system employing this salt as the absorbent, but it should be understood that the invention has general application to absorption refrigeration systems using any of several other known absorbent-refrigerant combinations.

Similarly, the present invention will be described in reference to an absorption refrigeration system suitably arranged for utilizing solar energy as a primary source of power to regenerate a concentrated absorbent solution. It should be clear, however, that any other low temperature energy source such as the normally unrecovered heat energy produced by many manufacturing processes or geothermal sources can likewise be employed in the practice of the present invention. Also, the term "concentrated solution" as used herein means a solution of relatively higher concentration in lithium bromide (approximately 64.5% by weight at maximum capacity), while the term "dilute solution" means a solution relatively lower in concentration of lithium bromide (approximately 59.5% by weight at maximum capacity).

Figure 1:
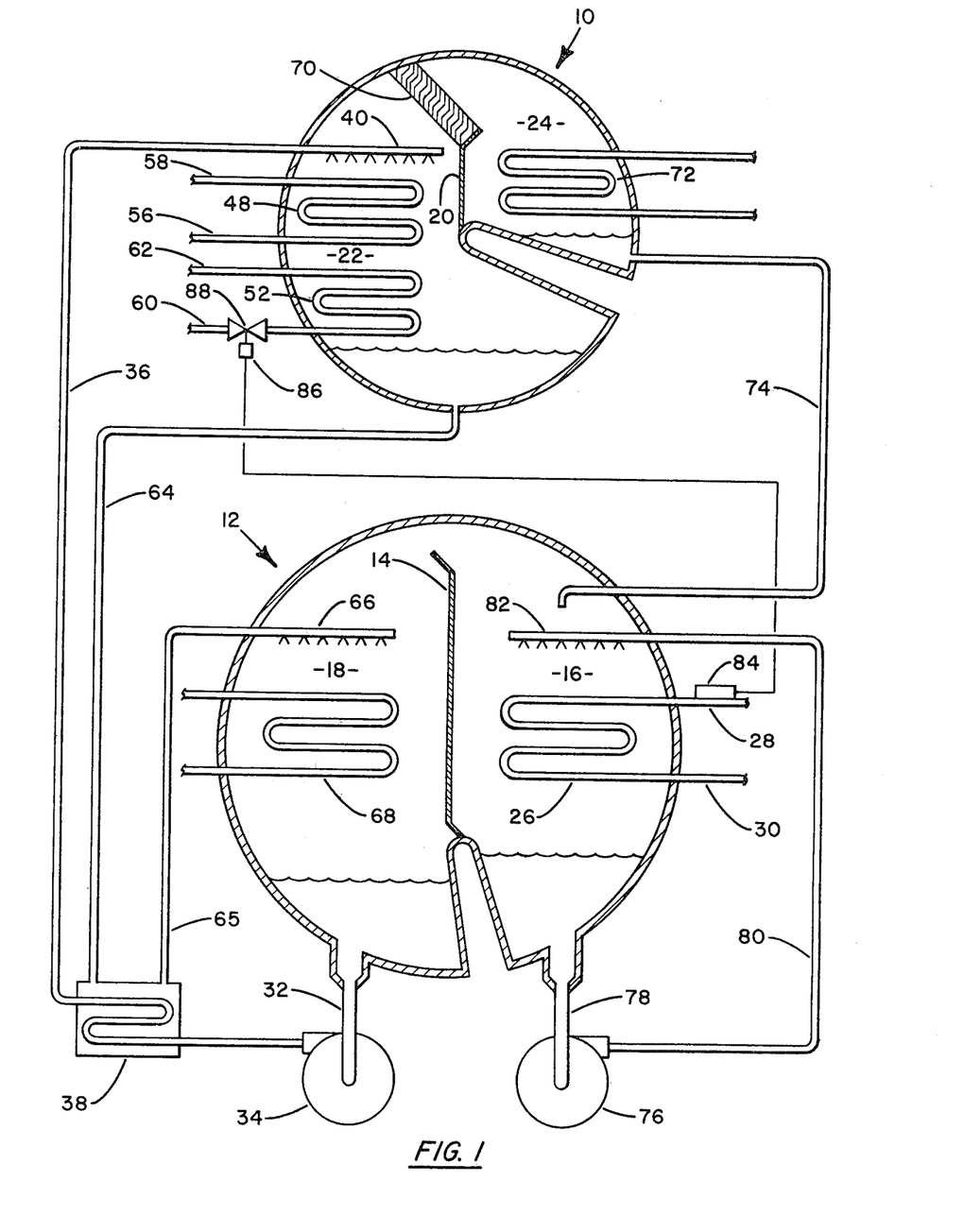
FIG. 1 is a schematic drawing of an absorption refrigeration system constructed according to the present invention and wherein the solution of refrigerant and absorbent fluid is sprayed over both the primary and auxiliary heat exchangers.

Referring now to the drawings, FIG. 1 is a schematic drawing of an absorption refrigeration system that is constructed according to the present invention. The system comprises, generally, an upper shell or vessel 10 and a lower shell or vessel 12. As is conventional in absorption refrigeration machines, the lower shell 12 is divided into two sections by a partition 14. The sections include an evaporator section 16 and an absorber section 18. Likewise, the upper shell 10 is separated by a partition 20 into a generator section 22 and a condenser section 24.

Under normal operating conditions, a refrigerant such as water is located in the evaporator 16 and refrigerant vapor passes from the evaporator to the absorber 18 where an absorbent fluid such as lithium bromide absorbs the vapor. This lowers the pressure in the evaporator 16 which allows more refrigerant to evaporate. The evaporation produces a refrigeration effect. To take advantage of this refrigeration effect, water, or some other suitable heat exchanging medium, is passed through a heat exchanging coil 26 located in the evaporator 16. The heat exchanging coil 26, commonly referred to as the chilled water coil, is connected by water lines 28 and 30 to a refrigeration load (not shown) such as a room that is to be cooled. The water is circulated between the water coil 26 and the refrigeration load. Refrigerant in the evaporator absorbs heat from the water as the water passes through the heat exchanger 26 and this allows the water, in turn, to absorb heat from the refrigeration load. Under normal operating conditions, the water enters the chilled water coil 26 at approximately 54° F. and leaves through line 28 at approximately 44° F.

As the absorbent fluid absorbs refrigerant vapor, the fluid becomes diluted and its affinity for refrigerant vapor decreases. In order to generate a concentrated absorbent fluid, the relatively dilute solution of refrigerant and absorbent fluid is drawn from the absorber 18 through fluid line 32 by pump 34 and then pumped through conduit 36, through heat exchanger 38, to be discussed below, and to a spray header or nozzle 40 which is positioned near the top of the generator 22. The generator 22 includes a primary heat exchanger 48 and an auxiliary heat exchanger 52. The primary heat exchanger 48 is operatively connected to a low temperature energy source such as a solar heat collector (not shown) by fluid supply and return lines 56 and 58 respectively. The auxiliary heat exchanger 52 is operatively connected to a conventional high temperature energy source (not shown) by supply line 60 and return line 62.

Figure 1A:
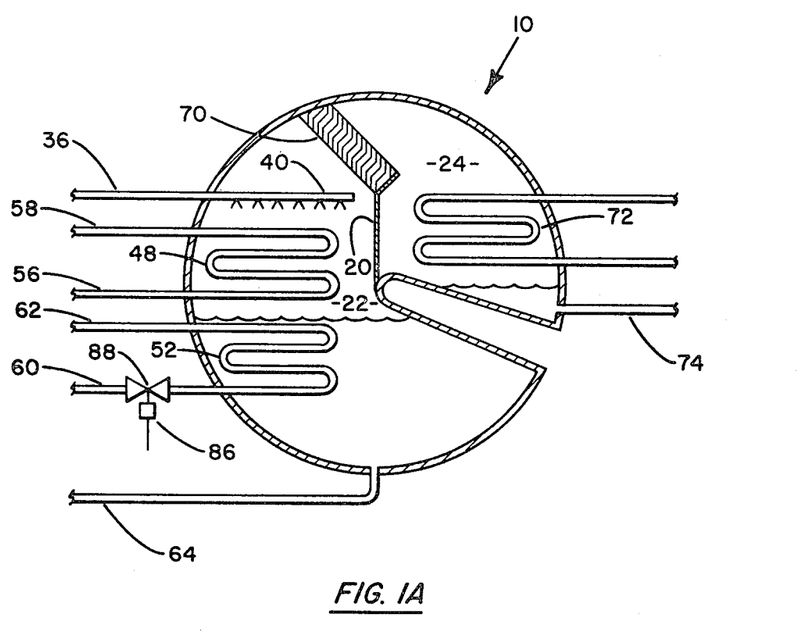
FIG. 1A is a schematic drawing of a portion of an absorption refrigeration system constructed according to the embodiment depicted in FIG. 1 but wherein the auxiliary heat exchanger is flooded by the solution of refrigerant and absorbent fluid.

As dilute solution is sprayed over the primary heat exchanger 48, heat is transferred from this heat exchanger to the solution and refrigerant is evaporated, or "boiled off," from the solution. The solution then flows over the auxiliary heat exchanger 52 where the solution can be further concentrated by hot water or steam being passed through the auxiliary heat exchanger from the high temperature energy source. After passing past the auxiliary heat exchanger, the concentrated solution flows to the bottom of the generator 22. Although in a preferred system, depicted in FIG. 1, the solution is sprayed over and flows through the auxiliary heat exchanger 52, the solution may be collected in the lower part of the generator 22, as illustrated in FIG. 1A, so that the auxiliary heat exchanger is flooded by the solution.

From the generator 22 the concentrated solution flows through fluid line 64 and through the heat exchanger 38. The heat exchanger 38 is used to increase the efficiency of the system by transferring heat from the relatively warm, concentrated solution coming from the generator 22 to the relatively cool, dilute solution coming from the absorber 18. This has the effect of preheating the dilute solution before it enters the generator 22 and precooling the concentrated solution before it enters the absorber 18. After passing through the heat exchanger 38, the concentrated solution flows through fluid line 65 to a spray header or nozzle 66 which is positioned in the absorber 18. In the absorber 18, the concentrated solution is sprayed over a heat exchanger 68 which is connected to a source (not shown) of relatively cool water such as a cooling tower of any conventional design. The cooled, concentrated solution in the absorber 18 can absorb refrigerant vapor thereby continuing the production of the refrigeration effect in the evaporator 16.

Refrigerant evaporated in the generator 22 from the dilute solution passes through a liquid eliminator 70 to the condenser 24 where it is cooled and condensed by cooling water flowing through heat exchanger 72. The source of the cooling water for heat exchanger 72 may be the same source as for the heat exchanger 68 located in the absorber 18. As absorption refrigeration systems are commonly constructed, these two heat exchangers may be connected in series. Condensed refrigerant flows to the bottom of condenser 24, and then the refrigerant flows through fluid line 74 to the evaporator 16. A refrigerant pump 76 is connected to the evaporator 16 by line 78 to recirculate through the evaporator refrigerant that has collected in the bottom of the evaporator. The pump 76 draws refrigerant from the bottom of the evaporator 16 through line 78 and then discharges it through conduit 80 to a spray header 82 which is located in the evaporator above the chilled water coil 26.

Returning to the generator 22, the primary heat exchanger 48 is located above the auxiliary heat exchanger 52 so that the relatively dilute solution comes into thermal contact with the primary heat exchanger 48 before heat is transferred to the solution from the auxiliary heat exchanger 52. Hence, heat is transferred from the primary heat exchanger 48 to the dilute solution at a position where the temperature difference between the solution and the primary heat exchanger is maximized. This tends to maximize the amount of heat transferred from the primary heat exchanger 48 to the absorbent fluid. In addition, the operation of the auxiliary heat exchanger 52 is regulated in response to the temperature of the water passing out of the evaporator 16 through the chilled water coil 26. A temperature sensor 84 is affixed to the water line 28 and is arranged to send a temperature indicative signal to a regulator 86. The regulator 86, in turn, controls a valve 88 located in the fluid supply line 60 associated with the auxiliary heat exchanger 52. The control valve 84, thus, is opened and closed to vary the amount of energy provided to the dilute solution in the generator 22 from the auxiliary, high temperature energy source. If the amount of heat extracted from the low temperature energy source is adequate to generate an absorbent solution of sufficient concentration to permit the absorption refrigeration system to achieve the desired refrigeration effect in the evaporator 16, then no hot water or steam from the auxiliary, high temperature energy source need be passed through the auxiliary heat exchanger 52. If, however, the amount of low temperature energy available is insufficient to generate such a concentrated solution, then the auxiliary energy source can be utilized to assist the low temperature energy. The valve 88 can control the amount of energy transmitted to the dilute solution through the auxiliary heat exchanger 52 from the auxiliary, high energy source to insure that no more energy is contributed by the auxiliary energy source than what is necessary to permit the desired refrigeration effect. This also tends to maximize the amount of energy supplied to the refrigeration system by the primary, low temperature energy source.

FIGS. 2, 2A, 3, 3A and 4 are schematic representations of alternate embodiments of the present invention. Each of these figures shows only a portion of an absorption refrigeration system, it being understood that the portion illustrated is for use in the system of FIG. 1. Furthermore, like numbers will be used to refer to elements of one figure that also appear in another figure.

Figure 2:
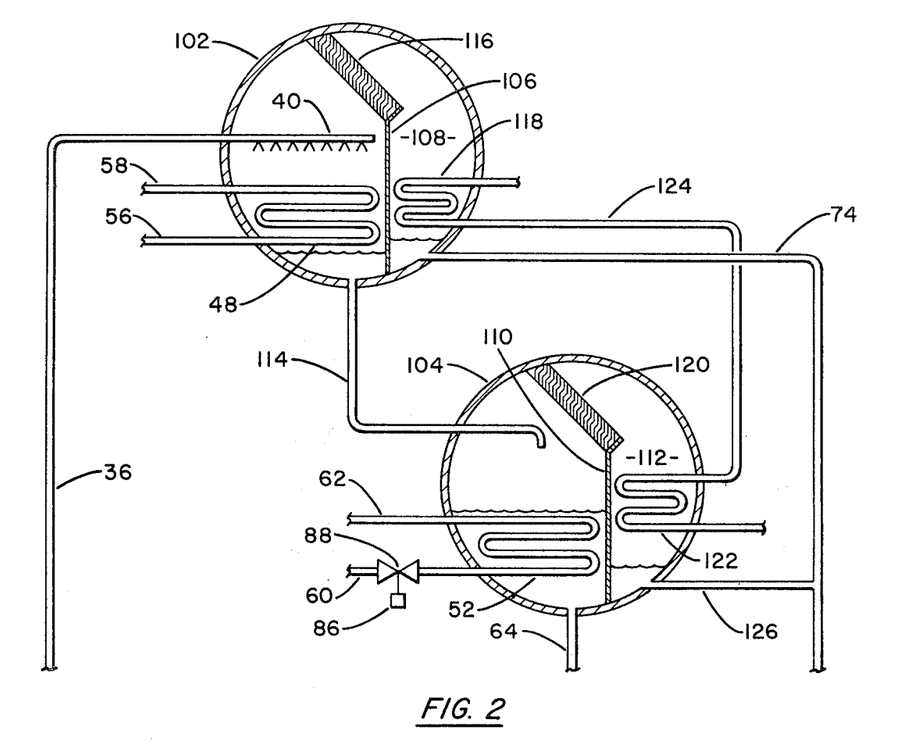
FIG. 2 is a schematic drawing of portions of an absorption refrigeration system constructed according to a second embodiment of the present invention and wherein the auxiliary heat exchanger is flooded by the solution of refrigerant and absorbent fluid.

The system shown in FIG. 2 has the primary heat exchanger 48 and the auxiliary heat exchanger 52 located in separate vessels or shells 102 and 104 respectively to help insure that no heat is transferred from the auxiliary heat exchanger 52 to the dilute solution while that solution is in thermal contact with the primary heat exchanger 48. This, in turn, helps insure that the amount of heat transferred from the low temperature energy source to the dilute solution via the primary heat exchanger 48 is maximized.

Figure 2A:
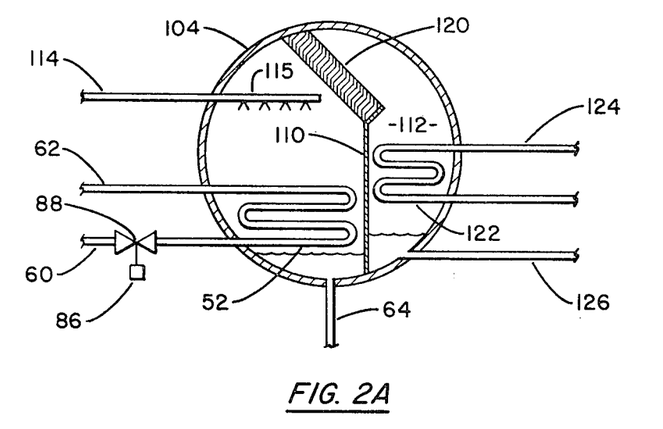
FIG. 2A is a schematic drawing of a portion of an absorption refrigeration system constructed according to the embodiment depicted in FIG. 2 but wherein the solution of refrigerant and absorbent fluid is sprayed over the auxiliary heat exchanger.

A partition 106 in the primary heat exchanger shell 102 separates the primary heat exchanger 48 from a primary condenser 108, and a partition 110 in the auxiliary heat exchanger shell 104 separates the auxiliary heat exchanger 52 from an auxiliary condenser 112. The dilute solution from the absorber 18 (shown only in FIG. 1) is pumped to spray header 40 in shell 102 via fluid line 36 and then sprayed over and through the primary heat exchanger 48. Heat is transferred from the primary, low temperature energy source to the dilute solution via the primary heat exchanger 48, and this heat concentrates the solution. The solution flows to the bottom of shell 102 and then flows through conduit 114 to shell 104. In shell 104, the solution can be further concentrated by heat transferred to the solution from the auxiliary, high temperature energy source by means of the auxiliary heat exchanger 52. From shell 104, the concentrated solution flows through fluid line 64, through heat exchanger 38 and to the absorber 18. In a preferred arrangement, illustrated in FIG. 2, the solution is collected by the auxiliary heat exchanger shell 104 so that the auxiliary heat exchanger 52 is flooded by the solution. But, the solution may, instead, be sprayed over and through the auxiliary heat exchanger 52, as shown in FIG. 2A.

Just as with the system shown in FIG. 1, the system depicted in FIG. 2 includes a valve 88 located in fluid supply line 60 to regulate the amount of energy transmitted to the solution from the conventional, high temperature energy source. The valve 88 is controlled by a regulator 86 which is responsive to the temperature of the water passing out of the evaporator 16 through the water line 28. In this manner, the energy contributed by the auxiliary energy source is only enough to insure that the absorbent solution is sufficiently concentrated to produce the desired refrigeration effect.

Refrigerant evaporated from the dilute solution by the primary heat exchanger 48 passes through a liquid eliminator 116 to the primary condenser 108 where it is condensed by a cooling liquid flowing through heat exchanger 118. Similarly, refrigerant evaporated from the solution of refrigerant and absorbent fluid by the auxiliary heat exchanger 52 passes through a liquid eliminator 120 to the auxiliary condenser 112 where it is condensed by a cooling liquid flowing through heat exchanger 122. The heat exchangers 118 and 122 are connected in series by fluid line 124 and they may be connected in series to the heat exchanger 68 in the absorber 18 so that only one source of cooling liquid is needed for the entire system. Fluid line 74 connects the primary condenser 108 with the evaporator 16 and the auxiliary condenser 112 is connected to fluid line 74 by conduit 126 so that the condensed refrigerant can flow back to the evaporator.

Figure 3:
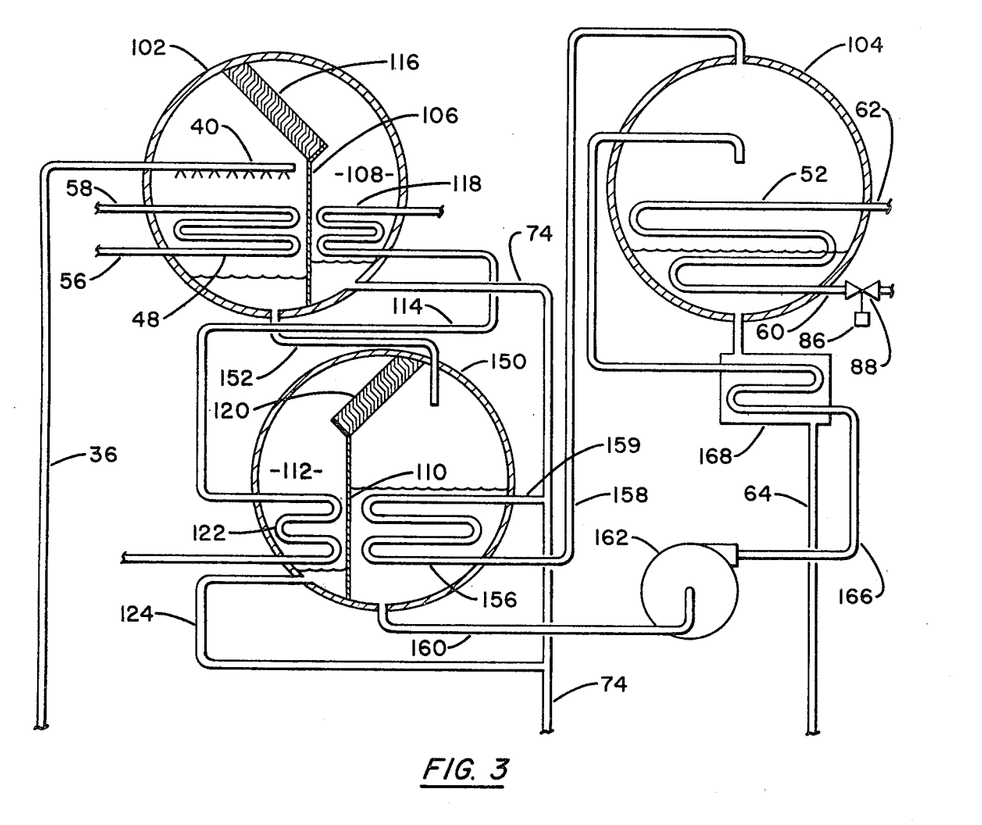
FIG. 3 is a schematic drawing of portions of an absorption refrigeration system having a third, intermediate heat exchanger which is flooded by the solution of refrigerant and absorbent fluid.

The system illustrated in FIG. 3 utilizes the heat transferred to the refrigerant as it is evaporated from the solution in the auxiliary heat exchanger shell 104 to obtain an even more concentrated absorbent solution. As in the embodiment shown in FIGS. 2 and 2A, the primary heat exchanger 48 is positioned in a primary shell 102 and the auxiliary heat exchanger 52 is positioned in an auxiliary shell 104. Also, as with the systems discussed above, the supply of hot water or steam passing through the auxiliary heat exchanger 52 is controlled by valve 88 which, in turn, acts in response to the temperature of the water leaving the evaporator 16. The condenser of the system shown in FIG. 3 includes a primary condenser 108 and an auxiliary condenser 112. The auxiliary condenser 112 is separated from the auxiliary heat exchanger shell 104 and is positioned in an intermediate shell or vessel 150. The auxiliary condenser 112 includes a heat exchanger 122 that is connected in series by fluid line 114 to heat exchanger 118 which is positioned in the primary condenser 108. A partition 110 in the intermediate shell 150 separates the auxiliary condenser 112 from an intermediate heat exchanger 156.

Figure 3A:
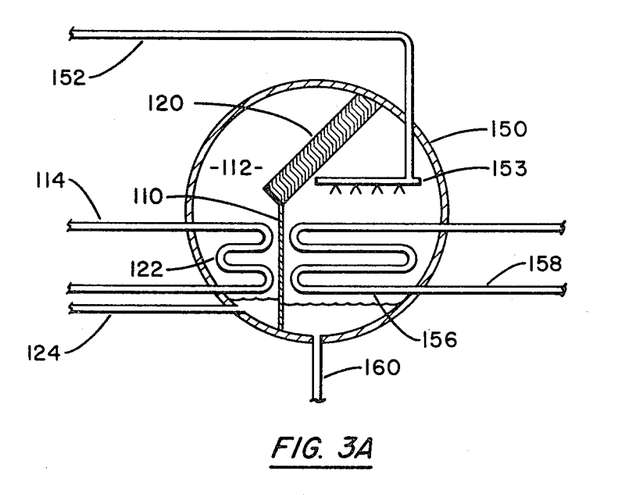
FIG. 3A is a schematic drawing of a portion of an absorption refrigeration system similar to the system depicted in FIG. 3 but wherein the solution of refrigerant and absorbent fluid is sprayed over the third, intermediate heat exchanger.

The intermediate heat exchanger 156 is connected to the auxiliary shell 104 by fluid line 158 so that refrigerant vapor evaporated from the solution of refrigerant and absorbent fluid in the auxiliary shell 104 can pass through the heat exchanger 156. Solution of refrigerant and absorbent fluid can flow from the primary shell 102 to the intermediate shell 150 via conduit 152. In the intermediate shell 150, heat is transferred from the refrigerant passing through heat exchanger 156 to the solution, thereby evaporating refrigerant from the solution. Thus, this embodiment utilizes normally wasted heat to further concentrate the solution thereby decreasing the amount of energy supplied to the system by the auxiliary energy source. FIG. 3 shows a system wherein the intermediate shell 150 collects the solution of refrigerant and absorbent fluid so that the intermediate heat exchanger 156 is flooded by the solution. Alternately, as illustrated in FIG. 3A, the solution may be sprayed over and through the heat exchanger 156 by spray header or nozzle 153.

Refrigerant evaporated from the solution in the intermediate shell 150 passes through liquid eliminator 120 into the auxiliary condenser 112 where it is condensed. From the auxiliary condenser 112, the condensed refrigerant passes through fluid line 124 to line 74 through which the refrigerant flows to the evaporator 16. As refrigerant vapor which was evaporated from the solution in the auxiliary shell 104 passes through the heat exchanger 156 and transfers heat to the solution of refrigerant and absorbent fluid in the intermediate shell 150, the refrigerat vapor is condensed. The heat exchanger 156 is connected to fluid line 74 by fluid line 159 in order that this condensed refrigerant can pass back to the evaporator 16.

A pump 162 is positioned to draw the solution of refrigerant and absorbent fluid from the intermediate shell 150 through fluid line 160 and to discharge the solution through fluid line 166, through heat exchanger 168, to be discussed below, and into the auxiliary shell 104. After being further concentrated in the auxiliary shell 104, the concentrated solution passes through fluid line 64, through heat exchanger 168, and to the absorber 18. The heat exchanger 168, operating in a manner similar to that of the heat exchanger 38 shown in FIG. 1, preheats the solution about to enter the auxiliary shell 104 and precools the solution leaving that shell.

In the embodiments shown in FIGS. 2, 2A, 3, and 3A, as the auxiliary energy source supplies an increasing share of the total energy consumed by the system, the auxiliary heat exchanger 52 evaporates an increasing portion of the total amount of refrigerant evaporated from the solution of refrigerant and absorbent fluid. As this occurs, the auxiliary condenser 112 condenses an increasing share of the total amount of refrigerant condensed by the refrigeration system. Under circumstances in which the low temperature energy source provides only a minimal amount of energy, the amount of refrigerant condensed in the auxiliary condenser 112 is considerably greater than the amount of refrigerant condensed in the primary condenser 108. Such circumstances might be present if, for example, the low temperature energy source was solar energy and there was a prolonged period of extensive cloud cover.

Figure 4:
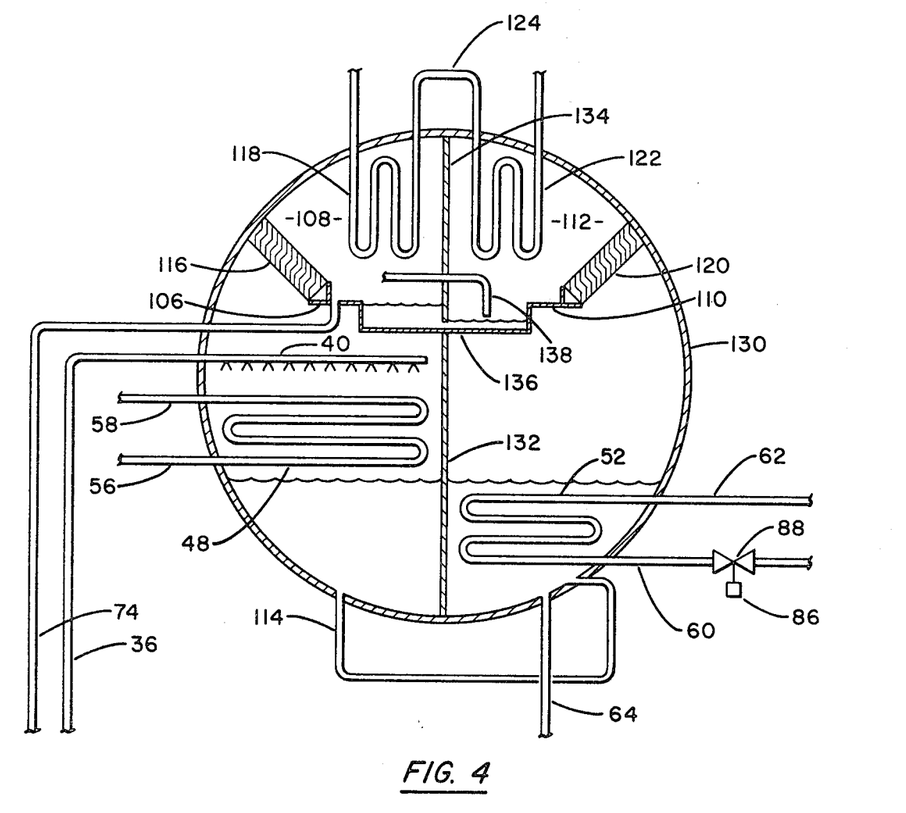
FIG. 4 is a schematic drawing of portions of an absorption refrigeration system constructed according to another embodiment of the present invention.

FIG. 4 shows another embodiment of the present invention which is intended to insure that under the above mentioned, or similar, operating conditions there is an approximately equal distribution of the condensing operation between the primary condenser 108 and auxiliary condenser 112. FIG. 4 shows only the generator and condenser portions of an absorption refrigeration system with fluid lines 36, 64, and 74 connecting the segments illustrated in FIG. 4 with the evaporator and absorber portions of the system shown in FIG. 1. Thus, the discussion below will refer to the generator and condenser shown in FIG. 4 and to the evaporator and absorber shown in FIG. 1. In addition, like numbers will be used to refer to elements of FIG. 4 that are also shown in the other Figures. The embodiment shown in FIG. 4 houses the primary heat exchanger 48, the auxiliary heat exchanger 52, the primary condenser 108, and the auxiliary condenser 112 in a single shell 130. Partitions 132 and 134 are used to thermally separate the primary portions of the shell 130 from the auxiliary portions of that shell to prevent heat from being transferred from the auxiliary heat exchanger 52 to the dilute solution of refrigerant and absorbent fluid while that solution is in thermal contact with the primary heat exchanger 48.

A liquid container or receptacle 136 is common to both condensers 108 and 112 and allows condensed refrigerant to flow from the auxiliary condenser to the primary condenser from where the refrigerant can flow through fluid line 74 to the evaporator 16. Usually, the liquid level in the primary condenser 108 side of the receptacle 136 will be different than the liquid level in the auxiliary condenser 112 side of the receptacle. This difference is due to the different vapor pressures in the two condensers. A vapor tube 138 extends through the partition 134 to also connect the primary condenser 108 with the auxiliary condenser 112. The end of the vapor tube 138 that is positioned in the primary condenser 108 is referred to as the primary condenser end, and the end of the vapor tube which is positioned in the auxiliary condenser 112 is referred to as the auxiliary condenser end. The vapor tube 138 is bent so that while the primary condenser end of the tube is above the top of the container 136, the auxiliary condenser end of the tube is below the top of the container. With this arrangement, the level of collected condensed refrigerant in the auxiliary condenser 112 side of receptacle 136 controls vapor flow from the auxiliary condenser to primary condenser 108. Under typical operating conditions, condensed refrigerant collects in the receptacle 136 and, in the auxiliary condenser 112 side of the receptacle, rises to a level above the auxiliary condenser end of the vapor tube 138. This closes the vapor tube 138 terminating refrigerant vapor flow between the auxiliary condenser 112 and the primary condenser 108 via the vapor tube.

When operating conditions become atypical and the auxiliary energy source is called upon to contribute a substantial portion of the energy required by the refrigeration system, the amount of refrigerant evaporated by the auxiliary heat exchanger 52 increases. As the amount of refrigerant evaporated by the auxiliary heat exchanger 52 increases, so too the amount of refrigerant condensed in the auxiliary condenser 112 also increases. As the amount of refrigerant condensed in the auxiliary condenser 112 becomes greater than the amount of refrigerant condensed in the primary condenser 108, the vapor pressure in the auxiliary condenser becomes greater than the vapor pressure in the primary condenser. This pressure difference forces the liquid on the auxiliary condenser side of container 136 to a level lower than the liquid on the primary condenser side of the container. When the pressure differences reaches a predetermined amount, the liquid on the auxiliary condenser side of container 136 is forced below the auxiliary condenser end of the vapor flow tube 138. This opens the vapor flow tube 138 and allows uncondensed refrigerant vapor to pass from the auxiliary condenser 112 to the primary condenser 108. This allows for a more even distribution of the refrigerant vapor between the auxiliary 112 and the primary 108 condensers so that the heat exchangers 118 and 122 of both condensers can be efficiently utilized despite the fact that the auxiliary heat exchanger 52 may be evaporating substantially more refrigerant than the primary heat exchanger 48.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

What is claimed is:

1. In an absorbent refrigeration system for cooling a heat transfer medium passing between the system and a refrigeration load, and having a generator enclosed within a shell, a method of generating a concentrated absorbent solution comprising the steps of:
    conducting a dilute solution of refrigerant and absorbent fluid through the generator;
    transmitting heat from a low temperature energy source to the dilute solution conducted through the generator to drive off refrigerant vapor;
    transmitting heat from a high temperature energy source to the dilute solution conducted through the generator to drive off additional refrigerant vapor after heat has been transmitted to the dilute solution from the low temperature energy source; and
    controlling the amount of heat transmitted to the dilute solution from the high temperature energy source in response to the difference between the heat required to produce the desired concentrated solution and the heat transmitted to the solution from the low temperature energy source.

2. In an absorption refrigeration system for cooling a heat transfer medium passing between the system and a refrigeration load, a method of generating a concentrated absorbent solution comprising the steps of:
    passing heat from a low temperature energy source to a primary heat exchanger;
    passing dilute solution in heat transfer relation with the primary heat exchanger to drive off refrigerant vapor by spraying the dilute solution through the primary heat exchanger;
    passing heat from a high temperature energy source to an auxiliary heat exchanger;
    passing dilute solution in heat transfer relation with the auxiliary heat exchanger after the dilute solution has passed in heat transfer relation with the primary heat exchanger to drive off additional refrigerant vapor by
    accumulating solution sprayed through the primary heat exchanger, and
    flooding the auxiliary heat exchanger with the accumulated solution; and
    controlling the amount of heat transmitted to the dilute solution from the high temperature energy source in response to the difference between the heat required to produce the desired concentrated solution and the heat transmitted to the solution from the low temperature energy source.

3. In an absorption refrigeration system for cooling a heat transfer medium passing between the system and a refrigeration load, a method of generating a concentrated absorbent solution comprising the steps of:
    passing heat from a low temperature energy source to a primary heat exchanger;
    passing dilute solution in heat transfer relation with the primary heat exchanger to drive off refrigerant vapor by spraying dilute solution through the primary heat exchanger;
    passing heat from a high temperature energy source to an auxiliary heat exchanger;
    passing dilute solution in heat transfer relation with the auxiliary heat exchanger after the dilute solution has passed in heat transfer relation with the primary heat exchanger to drive off additional refrigerant vapor by passing dilute solution from a primary shell containing the primary heat exchanger to an auxiliary shell containing the auxiliary heat exchanger, accumulating the solution passed to the auxiliary shell, and flooding the auxiliary heat exchanger with the accumulated solution; and controlling the amount of heat transmitted to the dilute solution from the high temperature energy source in response to the difference between the heat required to produce the desired concentrated solution and the heat transmitted to the solution from the low temperature energy source.

4. In an absorption refrigeration system for cooling a heat transfer medium passing between the system and a refrigeration load, a method of generating a concentrated absorbent solution comprising the steps of:

passing heat from a low temperature energy source to a primary heat exchanger;

passing dilute solution in heat transfer relation with the primary heat exchanger to drive off refrigerant vapor by spraying dilute solution through the primary heat exchanger;

passing heat from a high temperature energy source to an auxiliary heat exchanger;

passing dilute solution in heat transfer relation with the auxiliary heat exchanger after the dilute solution has passed in heat transfer relation with the primary heat exchanger to drive off additional refrigerant;

controlling the amount of heat transmitted to the dilute solution from the high temperature energy source in response to the difference between the heat required to produce the desired concentrated solution and the heat transmitted to the solution from the low temperature energy source; and passing dilute solution in heat transfer relation with refrigerant vapors separated therefrom by heat transmitted thereto from the high temperature energy source by passing refrigerant vapors from an auxiliary shell containing the auxiliary heat exchanger through an intermediate heat exchanger, passing dilute solution from a primary shell containing the primary heat exchanger to an intermediate shell containing the intermediate heat exchanger after the dilute solution has passed through the primary heat exhanger, and spraying dilute solution over the intermediate heat exchanger; and wherein the step of passing dilute solution in heat transfer relation with the auxiliary heat exchanger include the step of passing the dilute solution from the intermediate shell to the auxiliary shell after the dilute solution has passed in heat transfer relation with the intermediate heat exchanger.

5. In an absorption refrigeration system for cooling a heat transfer medium passing between the system and a refrigeration load, a method of generating a concentrated absorbent solution comprising the steps of:

passing heat from a low temperature energy source to a primary heat exchanger;

passing dilute solution in heat transfer relation with the primary heat exchanger to drive off refrigerant vapor by spraying dilute solution through the primary heat exchanger;

passing heat from a high temperature energy source to an auxiliary heat exchanger;

passing dilute solution in heat transfer relation with the auxiliary heat exchanger after the dilute solution has passed in heat transfer relation with the primary heat exchanger to drive off additional refrigerant;

controlling the amount of heat transmitted to the dilute solution from the high temperature energy source in response to the difference between the heat required to produce the desired concentrated solution and the heat transmitted to the solution from the low temperature energy source; and passing dilute solution in heat transfer relation with refrigerant vapors separated therefrom by heat transmitted thereto from the high temperature energy source by passing refrigerant vapors from an auxiliary shell containing the auxiliary heat exchanger through an intermediate heat exchanger positioned in an intermediate shell, passing dilute solution from a primary shell containing the primary heat exchanger to an intermediate shell containing the intermediate heat exchanger after the dilute solution has passed through the primary heat exchanger, and accumulating dilute solution in the intermediate shell, and flooding the intermediate heat exchanger with the accumulated solution; and wherein the step of passing dilute solution in heat transfer relation with the auxiliary heat exchanger includes the step of passing solution from the intermediate shell to the auxiliary shell after the solution has passed in heat transfer relation with the intermediate heat exchanger.

6. In an absorption refrigeration system having a primary condenser, an auxiliary condenser, and a vapor flow tube extending therebetween, a method of separating refrigerant vapors from a dilute solution of absorbent and refrigerant fluid and condensing the separated refrigerant vapors, the method including the steps of:

transmitting heat from a low temperature energy source to the dilute solution to drive off refrigerant vapor;

transmitting heat from a high temperature energy source to the dilute solution after heat has beeen transmitted thereto from the low temperature energy source to drive off additional refrigerant vapor;

condensing refrigerant separated from the dilute solution by heat transmitted thereto from the low temperature energy source in the primary condenser;

condensing refrigerant separated from the dilute solution by heat transmitted thereto from the high temperature energy source in the auxiliary condenser; and controlling vapor flow between the auxiliary and primary condensers by terminating vapor flow from the auxiliary condenser to the primary condenser when the vapor pressure in the auxiliary condenser is below a level exceeding the vapor pressure in the primary condenser by a predetermined value, and conducting vapor from the auxiliary condenser to the primary condenser when the vapor pressure in the auxiliary condenser exceeds said level.

7. The method of claim 6 wherein the controlling step includes the steps of collecting refrigerant condensed in the auxiliary condenser, changing the level of the collected condensed refrigerant in response to the difference between the vapor pressures in the auxiliary and primary condensers, and passing refrigerant vapors from the auxiliary condenser to the primary condenser when the collected condensed refrigerant reaches a predetermined level.

* * * * *